United States Patent
Komatsu et al.

(10) Patent No.: US 8,545,719 B2
(45) Date of Patent: Oct. 1, 2013

(54) LIQUID CRYSTAL POLYESTER COMPOSITION AND PROCESS FOR PRODUCING THE SAME

(75) Inventors: Shintaro Komatsu, Tsukuba (JP); Yoshiyuki Fukuhara, Tsuchiura (JP); Hiroshi Harada, Tsukuba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 13/368,525

(22) Filed: Feb. 8, 2012

(65) Prior Publication Data

US 2012/0217678 A1     Aug. 30, 2012

(30) Foreign Application Priority Data

Feb. 28, 2011  (JP) ................................. 2011-041474

(51) Int. Cl.
| | | |
|---|---|---|
| *C09K 19/52* | (2006.01) | |
| *C09K 19/30* | (2006.01) | |
| *C09K 19/00* | (2006.01) | |
| *C09K 19/06* | (2006.01) | |
| *G02F 1/1333* | (2006.01) | |

(52) U.S. Cl.
USPC .................... 252/299.01; 252/299.6; 428/1.1; 349/1; 349/86; 349/167

(58) Field of Classification Search
USPC .............. 252/299.01, 299.6; 428/1.1; 349/1, 349/86, 167
See application file for complete search history.

(56) References Cited

U.S. PATENT DOCUMENTS

| | | | |
|---|---|---|---|
| 6,733,691 B2 * | 5/2004 | Nagano et al. | ........... 252/299.67 |
| 2003/0001139 A1 | 1/2003 | Nagano et al. | |
| 2009/0197471 A1 | 8/2009 | Fukatsu et al. | |
| 2011/0086968 A1 | 4/2011 | Fukatsu et al. | |

FOREIGN PATENT DOCUMENTS

| | | |
|---|---|---|
| JP | 2002-294038 A | 10/2002 |
| JP | 2010-003661 A | 1/2010 |
| WO | 2008023839 A1 | 2/2008 |

* cited by examiner

*Primary Examiner* — Geraldina Visconti
(74) *Attorney, Agent, or Firm* — Panitch Schwarze Belisario & Nadel LLP

(57) ABSTRACT

The present invention provides a liquid crystal polyester composition, comprising (i) 100 parts by weight of a liquid crystal polyester, and (ii) 65 to 100 parts by weight of a combination of a fibrous filler with a plate-like filler, wherein the fibrous filler has a number-average fiber diameter of 5 to 15 μm, and a number-average aspect ratio of 20 to 40, and a content ratio by weight of the fibrous filler to the plate-like filler is more than 1.0 and 1.6 or less; and a process for producing the liquid crystal polyester composition comprising a step of melt-kneading the above respective components with one another.

23 Claims, 1 Drawing Sheet

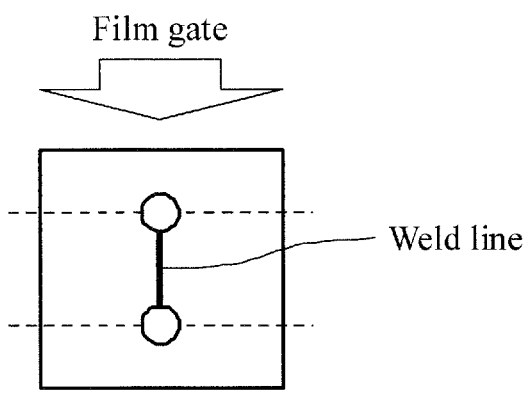

LIQUID CRYSTAL POLYESTER COMPOSITION AND PROCESS FOR PRODUCING THE SAME

FIELD OF THE INVENTION

The present invention relates to a liquid crystal polyester composition comprising a liquid crystal polyester, a fibrous filler and a plate-like filler; a process for producing such a liquid crystal polyester composition; and a molded article made from such a liquid crystal polyester composition.

BACKGROUND OF THE INVENTION

There is known in the art a liquid crystal polyester composition comprising a liquid crystal polyester, a fibrous filler and a plate-like filler, as follows:
(1) US 2003/1139A (counterpart of JP 2002-294038A) discloses a liquid crystal polyester composition obtained by blending:
  (1-1) 100 parts by weight of a liquid crystalline polyester,
  (1-2) 10 to 100 parts by weight of a fibrous filler having a number-average fiber diameter of 0.1 to 10 μm and a number-average fiber length of 1 to 100 μm, and
  (1-3) 10 to 100 parts by weight of a plate-like filler, wherein a content ratio of the fibrous filler to the plate-like filler in the liquid crystal polyester composition is more than 0 (zero) and less than 0.5, or more than 1.6 and less than 10;
(2) US 2009/197471A (counterpart of WO 2008/23839) discloses a liquid crystal polyester composition, comprising:
  (2-1) a liquid crystal polyester,
  (2-2) 10 to 20% by weight of a fibrous filler having an average fiber diameter of 5 to 30 μm and a weight-average fiber length of 250 to 350 μm, and
  (2-3) 30 to 40% by weight of a plate-like filler, wherein the total of the fibrous filler and the plate-like filler is 40 to 60% by weight; and
(3) US 2011/86968A (counterpart of JP 2010-3661A) discloses a liquid crystal polyester composition, comprising:
  (3-1) a liquid crystal polyester,
  (3-2) 10 to 25% by weight of a fibrous filler having a weight-average fiber length of 250 to 600 μm, and
  (3-3) 25 to 30% by weight of a plate-like filler, wherein the total of the fibrous filler and the plate-like filler is 40 to 50% by weight for the total composition.

SUMMARY OF THE INVENTION

However, a molded article made from each of the above liquid crystal polyester compositions is not necessarily sufficient in its weld strength. An object of the present invention is to provide (i) a liquid crystal polyester composition which can provide a molded article having excellent weld strength, (ii) a process for producing such a liquid crystal polyester composition, and (iii) a process for producing such a molded article.

The present invention provides a liquid crystal polyester composition, comprising:
  100 parts by weight of a liquid crystal polyester; and
  65 to 100 parts by weight of a combination of a fibrous filler with a plate-like filler;
wherein the fibrous filler has a number-average fiber diameter of 5 to 15 μm, and a number-average aspect ratio of 20 to 40, and a content ratio by weight of the fibrous filler to the plate-like filler is more than 1.0 and 1.6 or less.

Also, the present invention provides a process for producing a liquid crystal polyester composition, comprising a step of melt-kneading 100 parts by weight of a liquid crystal polyester; and 65 to 100 parts by weight of a combination of a fibrous filler with a plate-like filler, the fibrous filler having a number-average fiber diameter of 5 to 15 μm, and a number-average aspect ratio of 100 or more, thereby producing a liquid crystal polyester composition, comprising:
  100 parts by weight of the liquid crystal polyester; and
  65 to 100 parts by weight of the combination of the fibrous filler with the plate-like filler;
wherein the fibrous filler has a number-average fiber diameter of 5 to 15 μm, and a number-average aspect ratio of 20 to 40, and a content ratio by weight of the fibrous filler to the plate-like filler in the liquid crystal polyester composition is more than 1.0 and 1.6 or less.

Further, the present invention provides a process for producing a molded article, comprising a step of injection-molding the above-mentioned liquid crystal polyester composition, or a liquid crystal polyester composition produced by the above-mentioned process.

BRIEF DESCRIPTION OF THE DRAWINGS

FIG. 1 shows a top view of a molded article obtained in Example and Comparative Example.

DETAILED DESCRIPTION OF THE INVENTION

A liquid crystal polyester in the present invention shows liquid crystallinity in its molten state, and has a melting temperature of preferably 450° C. or lower. The liquid crystal polyester may be a liquid crystal polyester amide, a liquid crystal polyester ether, a liquid crystal polyester carbonate, or a liquid crystal polyester imide. The liquid crystal polyester is preferably a wholly aromatic liquid crystal polyester which is obtained using only an aromatic compound as a starting monomer.

Typical examples of the liquid crystal polyester are a liquid crystal polyester obtained by a polymerization reaction (polycondensation reaction) of an aromatic hydroxycarboxylic acid with an aromatic dicarboxylic acid and one or more kinds of compounds selected from the group consisting of an aromatic diol, an aromatic hydroxyamine and an aromatic diamine; a liquid crystal polyester obtained by a polymerization reaction of plural kinds of aromatic hydroxycarboxylic acids; a liquid crystal polyester obtained by a polymerization reaction of an aromatic dicarboxylic acid with one or more kinds of compounds selected from the group consisting of an aromatic diol, an aromatic hydroxyamine and an aromatic diamine; and a liquid crystal polyester obtained by a polymerization reaction of a polyester such as polyethylene terephthalate with an aromatic hydroxycarboxylic acid. A part or all of the above aromatic hydroxycarboxylic acid, aromatic dicarboxylic acid, aromatic diol, aromatic hydroxyamine or aromatic diamine may be replaced with its polymerizable derivatives, respectively.

Regarding the polymerizable derivatives, examples thereof of a compound having a carboxyl group, such as an aromatic hydroxycarboxylic acid and an aromatic dicarboxylic acid are its ester derivative in which the carboxyl group has been converted into an alkoxycarbonyl group or an aryloxycarbonyl group, its acid halide derivative in which the carboxyl group has been converted into a haloformyl group, and its acid anhydride derivative in which the carboxyl group has been converted into an acyloxycarbonyl group. Examples of the polymerizable derivatives of a compound having a hydroxyl group, such as an aromatic hydroxycarboxylic acid, an aromatic diol and an aromatic hydroxylamine are its acylate derivative in which the hydroxyl group has been converted into an acyloxyl group through acylation. Examples of the polymerizable derivative of a compound having an amino group, such as an aromatic hydroxyamine or an aromatic diamine are its acylate derivative in which the amino group has been converted into an acylamino group through acylation.

The liquid crystal polyester contains preferably a repeating unit represented by following formula (1) (referred to hereinafter as "repeating unit (1)"), and more preferably repeating unit (1), a repeating unit represented by following formula (2) (referred to hereinafter as "repeating unit (2)") and a repeating unit represented by following formula (3) (referred to hereinafter as "repeating unit (3)"):

—O—Ar$^1$—CO—, (1)

—CO—Ar$^2$—CO—, (2)

—X—Ar$^3$—Y—, (3)

—Ar$^4$—Z—Ar$^5$ (4)

wherein Ar$^1$ represents a phenylene group, a naphthylene group or a biphenylylene group; Ar$^2$ and Ar$^3$ represent independently of each other a phenylene group, a naphthylene group, a biphenylylene group or a group represented by above formula (4); X and Y represent independently of each other an oxygen atom or an imino group (—NH—); Ar$^4$ and Ar$^5$ represent independently of each other a phenylene group or a naphthylene group; Z represents an oxygen atom, a sulfur atom, a carbonyl group, a sulfonyl group or an alkylidene group; and one or more hydrogen atoms contained in the group represented by Ar$^1$, Ar$^2$ or Ar$^3$ may be substituted independently of one another with a halogen atom, an alkyl group or an aryl group.

Examples of the above halogen atom are a fluorine atom, a chlorine atom, a bromine atom and an iodine atom. Examples of the above alkyl group are an alkyl group having usually 1 to 10 carbon atoms, such as a methyl group, an ethyl group, a n-propyl group, an isopropyl group, a n-butyl group, an isobutyl group, a sec-butyl group, a tert-butyl group, a n-hexyl group, a 2-ethylhexyl group, a n-octyl group and a n-decyl group. Examples of the above aryl group are an aryl group having usually 6 to 20 carbon atoms, such as a phenyl group, an o-tolyl group, a m-tolyl group, a p-tolyl group, a 1-naphthyl group and a 2-naphthyl group. When the above one or more hydrogen atoms are substituted with a halogen atom, an alkyl group or an aryl group, the number of a substituent contained in Ar$^1$, Ar$^2$ or Ar$^3$ is usually 2 or less, and preferably 1 or less, independently of one another.

Examples of the above alkylidene group of Z are an alkylidene group having usually 1 to 10 carbon atoms, such as a methylene group, an ethylidene group, an isopropylidene group, a n-butylidene group and a 2-ethylhexylidene group.

Repeating unit (1) is derived from the above-mentioned aromatic hydroxycarboxylic acid. Repeating unit (1) is preferably a repeating unit derived from p-hydroxybenzoic acid in which Ar$^1$ is a p-phenylene group, or a repeating unit derived from 6-hydroxy-2-naphthoic acid in which Ar$^1$ is a 2,6-naphthylene group.

Repeating unit (2) is derived from the above-mentioned aromatic dicarboxylic acid. Repeating unit (2) is preferably a repeating unit derived from terephthalic acid in which Ar$^2$ is a p-phenylene group, a repeating unit derived from isophthalic acid in which Ar$^2$ is a m-phenylene group, or a repeating unit derived from 2,6-naphthalenedicarboxylic acid in which Ar$^2$ is a 2,6-naphthylene group.

Repeating unit (3) is derived from the above-mentioned aromatic diol, aromatic hydroxylamine or aromatic diamine. Repeating unit (3) is preferably a repeating unit derived from hydroquinone, p-aminophenol or p-phenylenediamine in which Ar$^3$ is a p-phenylene group, or a repeating unit derived from 4,4'-dihydroxybiphenyl, 4-amino-4'-hydroxybiphenyl or 4,4'-diaminobiphenyl in which Ar$^3$ is a 4,4'-biphenylylene group.

On the assumption that the liquid crystal polyester is a material composed of respective molecules represented by respective repeating units (1), (2) and (3), repeating unit (1) is contained in the liquid crystal polyester in an amount of usually 30% by mol or more, preferably 30 to 80% by mol, more preferably 40 to 70% by mol, and further preferably 45 to 65% by mol; repeating unit (2) is contained in the liquid crystal polyester in an amount of usually 35% by mol or less, preferably 10 to 35% by mol, more preferably 15 to 30% by mol, and further preferably 17.5 to 27.5% by mol; and repeating unit (3) is contained in the liquid crystal polyester in an amount of usually 35% by mol or less, preferably 10 to 35% by mol, more preferably 15 to 30% by mol, and further preferably 17.5 to 27.5% by mol, provided that the total of repeating units (1), (2) and (3) contained in the liquid crystal polyester is 100% by mol. As the amount of repeating unit (1) is increased, the liquid crystal polyester is apt to be improved in its melt flowability, heat resistance, strength and rigidity. However, when the amount of repeating unit (1) is larger than 80% by mol, the liquid crystal polyester is apt to be too high in its melt temperature and melt viscosity, which is apt to result in unnecessarily high molding temperature.

A molar ratio of the amount of repeating unit (2) contained in the liquid crystal polyester to that of repeating unit (3) contained therein is usually 0.9/1 to 1/0.9, preferably 0.95/1 to 1/0.95, and more preferably 0.98/1 to 1/0.98.

The liquid crystal polyester may contain two or more kinds of respective repeating units (1) to (3). The liquid crystal polyester may contain other repeating unit than repeating units (1) to (3), and its content is usually 10% by mol or less, and preferably 5% by mol or less, provided that the total of repeating units contained in the liquid crystal polyester is 100% by mol.

The liquid crystal polyester preferably contains repeating unit (3) whose X and Y are both an oxygen atom, which corresponds to a repeating unit derived from an aromatic diol, and more preferably contains only a repeating unit, —O—Ar$^3$—O—, as repeating unit (3), in order to decrease a melt viscosity of the liquid crystal polyester.

The liquid crystal polyester is preferably produced by a method with satisfactory operability, comprising steps of (1) melt-polymerizing starting monomers providing respective repeating units (1) to (3), thereby producing a polymer (referred to hereinafter as "prepolymer"); and (2) solid phase-polymerizing the prepolymer, thereby obtaining a high molecular weight liquid crystal polyester having a thermal resistance and high strength and rigidity. Step (1) may be carried out in the presence of a catalyst, and examples thereof are a metal compound such as magnesium acetate, stannous acetate, tetrabutyl titanate, lead acetate, sodium acetate, potassium acetate and antimony trioxide; and a nitrogen-containing heterocyclic compound such as 4-(dimethylamino)pyridine and 1-methylimidazole. Among them, preferred is a nitrogen-containing heterocyclic compound.

The liquid crystal polyester has a flow beginning temperature of usually 270° C. or higher, preferably 270 to 400° C., and more preferably 280 to 380° C. When the flow beginning temperature is higher, the liquid crystal polyester is apt to be improved in its heat resistance, strength and rigidity. However, when the flow beginning temperature is higher than 400° C., the liquid crystal polyester is apt to be too high in its melt temperature and melt viscosity, which is apt to result in unnecessarily high molding temperature. The flow beginning temperature is also called a flow temperature, and is an indication of a molecular weight of the liquid crystal polyester (see "Liquid Crystal Polymer—Synthesis, Molding and Application—" edited by Naoyuki Koide, page 95, published by CMC CO., LTD., issued on Jun. 5, 1987). The flow beginning temperature is the temperature at which the liquid crystal polyester indicates melt viscosity of 4,800 Pa·s (48,000 poise), and is measured using a capillary rheometer by a method comprising steps of (i) heating the liquid crystal polyester at a temperature-increasing rate of 4° C./minute under a load of 9.8 MPa (100 kg/cm$^2$), (ii) extruding the melted liquid crystal polyester through a nozzle having an inner diameter of 1 mm and length of 10 mm, and (iii) observing a temperature at which the melted liquid crystal polyester indicates a melt viscosity of 4,800 Pa·s (48,000 poise).

The fibrous filler in the present invention is a fibrous inorganic filler, a fibrous organic filler or a combination thereof. Examples of the fibrous inorganic filler are a glass fiber; a carbon fiber such as a carbon fiber made from polyacrylonitrile and a carbon fiber made from pitch; a ceramic fiber such as a silica fiber, an alumina fiber and a silica-alumina fiber; a metal fiber such as a stainless-steel fiber; and a whisker such as a potassium titanate whisker, a barium titanate whisker, a wollastonite whisker, an aluminum borate whisker, a silicon nitride whisker and a silicon carbide whisker. Among them, preferred is one or a combination of two or more selected from the group consisting of a glass fiber, a potassium titanate whisker, a wollastonite whisker and an aluminum borate whisker, and more preferred is a glass fiber.

The fibrous filler used in the present invention has a number-average fiber diameter of 5 to 15 μm; a number-average fiber length of 1 to 3 mm; and a number-average aspect ratio (number-average fiber length/number-average fiber diameter) of 100 or more, and preferably 200 or more, and usually 500 or less, and preferably 400 or less. Because the present invention uses the fibrous filler having such a large aspect ratio (namely, relatively long fibrous filler), the liquid crystal polyester composition of the present invention contains the fibrous filler having such a large number-average aspect ratio of 20 to 40, and preferably 30 to 40 (namely, relatively long fibrous filler), which results in excellent weld strength of a molded article made from the liquid crystal polyester composition of the present invention. The above number-average fiber diameter and number-average fiber length can be measured with an electron microscope. Because the fibrous filler used in the present invention does not substantially change in its number-average fiber diameter (5 to 15 μm) through the melt-kneading in the process of the present invention, the fibrous filler contained in the liquid crystal polyester composition of the present invention has substantially the same number-average fiber diameter (5 to 15 μm) as that of the starting fibrous filler.

The plate-like filler in the present invention is usually an inorganic plate-like filler. Examples of the inorganic plate-like filler are talc, mica, graphite, wollastonite, a glass flake, barium sulfate, calcium carbonate, and a combination of two or more thereof. Among them, preferred is talc and/or mica, and more preferred is talc.

The plate-like filler used in the process of the present invention has a volume-average particle diameter of preferably 10 to 30 μm and more preferably 10 to 20 μm, in order to improve weld strength of a molded article made from the liquid crystal polyester composition of the present invention.

The above volume-average particle diameter of the plate-like filler can be measured by laser diffractometry.

The plate-like filler does not change substantially in its volume-average particle diameter during the melt-kneading step in the process of the present invention. Therefore, the plate-like filler as a starting material is substantially the same as the plate-like filler contained in a liquid polyester composition produced by the process of the present invention in their volume-average particle diameter.

The liquid crystal polyester composition of the present invention contains (i) 100 parts by weight of the liquid crystal polyester, and (ii) 65 to 100 parts by weight, preferably 70 to 100 parts by weight, and more preferably 80 to 100 parts by weight of a combination of the fibrous filler with the plate-like filler. When the amount of the combination is smaller than 65 parts by weight, a molded article made from the liquid crystal polyester composition of the present invention may be insufficient in its weld strength-enhancing effect and in its warpage-reducing effect. When the amount of the combination is larger than 100 parts by weight, the liquid crystal polyester composition of the present invention may be insufficient in its melt flowability.

Regarding the above combination of the fibrous filler with the plate-like filler, a content ratio by weight of the fibrous filler to the plate-like filler is more than 1.0 and 1.6 or less, preferably 1.1 to 1.6, and more preferably 1.1 to 1.5, from a viewpoint of weld strength-improvement of a molded article made from the liquid crystal polyester composition of the present invention.

The liquid crystal polyester composition of the present invention may contain a granular filler. The granular filler means a filler having a shape (such as a spherical shape) other than the respective shapes of the above-mentioned fibrous filler and plate-like filler. Examples of the granular filler are silica, alumina, titanium oxide, a glass bead, a glass balloon, boron nitride, silicon carbide, calcium carbonate, and a combination of two or more thereof. Among them, preferred is a glass bead. The granular filler has a volume-average particle diameter of preferably 5 to 50 μm, and more preferably 10 to 40 μm, from a viewpoint of weld strength-improvement of a molded article made from the liquid crystal polyester composition of the present invention. The volume-average particle diameter can be measured by laser diffractometry. The granular filler can be contained in the liquid crystal polyester composition of the present invention in an amount of usually 20 parts by weight or less, and preferably 5 to 10 parts by weight, per 100 parts by weight of the liquid crystal polyester.

The above granular filler does not change substantially in its volume-average particle diameter during the melt-kneading step in the process of the present invention. Therefore, the granular filler as a starting material is substantially the same as the granular filler contained in a liquid polyester composition produced by the process of the present invention in their volume-average particle diameter.

The liquid crystal polyester composition of the present invention may contain an additive and/or other resin component than the above-mentioned liquid crystal polyester. Examples of the additive are an antioxidant, a heat stabilizer, an ultraviolet absorber, an antistatic agent, a surface-activating agent, a flame retardant and a coloring agent. The additive can be contained in the liquid crystal polyester composition in an amount of usually 5 parts by weight or less, per 100 parts by weight of the liquid crystal polyester. Examples of the above-mentioned other resin component are a thermoplastic resin such as polypropylene, a polyamide, a polyester other than the above-mentioned liquid crystal polyester, polystyrene, a polyphenylene sulfide, a polyether ketone, a polycarbonate, a polyphenylene ether and a polyetherimide; and a thermosetting resin such as a phenol resin, an epoxy resin, a polyimide resin and a cyanate resin. The other resin component can be contained in the liquid crystal polyester composition in an amount of usually 20 parts by weight or less, per 100 parts by weight of the liquid crystal polyester.

The liquid crystal polyester composition of the present invention can be produced preferably by a method, comprising steps of (1) melt-kneading the above-mentioned liquid crystal polyester, fibrous filler, plate-like filler and the above optionally-used other components with one another in an extruder, (2) extruding the resultant molten mixture with the extruder, thereby forming a strand, and (3) cutting the strand to obtain pellets. The extruder is preferably equipped with (i) a cylinder, (ii) one or more screws existing in the cylinder, and (iii) one or more inlets attached to the cylinder, and is more preferably equipped with also (iv) one or more vents attached to the cylinder.

A molded article comprising the above-mentioned liquid crystal polyester composition is produced preferably by a process using a melt of the liquid crystal polyester composition. Examples of the process are an extruding process such as an injection molding process, a T-die process and an inflation process; a compression molding process; a blow molding process; a vacuum molding process; and a press molding process. Among them, preferred is an injection molding process to produce a molded article having excellent weld strength.

Examples of the molded article are a bobbin such as an optical pickup bobbin and trans bobbin; a relay part such as a relay case, a relay base, a relay sprue and a relay armature; a connector such as RIMM, DDR, I/O, DIMM, a Board to Board connector, an FPC connector, a card connector and a CPU socket; a reflector such as a lamp reflector and an LED reflector; a holder such as a lamp holder and a heater holder; a diaphragm such as a loudspeaker diaphragm; a separation nail used for a machine such as a copying machine and a printing machine; a camera module part; a switch part; a motor part; a censer part; a hard disc drive part; an eating utensils such as a microwave oven; a car part; an aircraft part; and a sealant member used for a semiconductor devise or a coil. Even when the liquid crystal polyester composition of the present invention is molded to a thin-walled article, or an intricately-shaped article, those articles are excellent in their weld strength. Therefore, the liquid crystal polyester composition of the present invention can be used particularly preferably for a connector such as a CPU socket, which can be prevented from cracking (weld breaking) generally occurred in a melting step (reflow step) of a solder ball, or occurred in inserting a terminal pin.

EXAMPLE

The present invention is explained in more detail with reference to the following Example.

Reference Example 1

Production of Liquid Crystal Polyester (1)

A reactor equipped with a stirrer, a torquemeter, a nitrogen gas-inlet tube, a thermometer and a reflux condenser was provided with 994.5 g (7.2 mol) of p-hydroxybenzoic acid, 299.0 g (1.8 mol) of terephthalic acid, 99.7 g (0.6 mol) of isophthalic acid, 446.9 g (2.4 mol) of 4,4'-dihydroxybiphenyl, and 1,347.6 g (13.2 mol) of acetic anhydride. An empty space of the reactor was purged with nitrogen gas, and 0.18 g 1-methylimidazole was added thereto. The resultant mixture was stirred and heated in an atmosphere of nitrogen gas stream from room temperature up to 150° C. over 30 minutes, and was refluxed at 150° C. for 30 minutes. Additional 2.4 g of 1-methylimidazole was added thereto, and the mixture was heated from 150° C. up to 320° C. over 2 hours and 50 minutes while distilling away by-product acetic acid and unreacted acetic anhydride. Once the mixture was found to have an increase in its torque, the reaction mixture was taken out of the reactor. The reaction mixture was cooled to room temperature, and the obtained solid material (prepolymer) was crushed with a crusher. The crushed material was heated under a nitrogen atmosphere from room temperature up to 250° C. over one hour, and was further heated under a nitrogen atmosphere from 250° C. up to 295° C. over five hours, and was maintained at 295° C. for three hours, thereby solid phase-polymerizing the prepolymer. The resultant solid phase-polymerized material was cooled, thereby obtained powdery liquid crystal polyester (1). Liquid crystal polyester (1) was found to have a flow beginning temperature of 327° C.

Reference Example 2

Production of Liquid Crystal Polyester (2)

Reference Example 1 was repeated except that (i) 299.0 g (1.8 mol) of terephthalic acid was changed to 239.2 g (1.44 mol) thereof, (ii) 99.7 g (0.6 mol) of isophthalic acid was changed to 159.5 g (1.96 mol) thereof, and (iii) the solid phase-polymerization condition, namely, "the crushed material was heated under a nitrogen atmosphere from room temperature up to 250° C. over one hour, and was further heated under a nitrogen atmosphere from 250° C. up to 295° C. over five hours, and was maintained at 295° C. for three hours" was changed to "the crushed material was heated under a nitrogen atmosphere from room temperature up to 220° C. over one hour, and was further heated under a nitrogen atmosphere from 220° C. up to 240° C. over 30 minutes, and was maintained at 240° C. for ten hours", thereby obtained powdery liquid crystal polyester (2). Liquid crystal polyester (2) was found to have a flow beginning temperature of 286° C.

The above flow beginning temperature was measured using a flow tester, "CFT-500" manufactured by Shimadzu Corporation, by a method comprising steps of (i) putting about 2 g of above-obtained liquid crystal polyester in a cylinder equipped with a die having a nozzle (inner diameter of 1 mm and length of 10 mm), (ii) melting the liquid crystal polyester by heating at a temperature-increasing rate of 4° C./minute under a load of 9.8 MPa (100 kg/cm$^2$), (iii) extruding the melted liquid crystal polyester through the nozzle, and (iv) observing a temperature (flow beginning temperature) at which the melted liquid crystal polyester indicates a melt viscosity of 4,800 Pa·s (48,000 poise).

Examples 1 to 6 and Comparative Examples 1 to 5

There were melt-kneaded below-mentioned components (i) to (v) at 330° C. with one another in their respective proportions as shown in Table 1, by use of a co-rotating twin screw extruder, "PCM-30HS" manufactured by Ikegai Corp., (i) above-produced liquid crystal polyester (1), (ii) above-produced liquid crystal polyester (2), (iii) a chopped glass fiber as the fibrous filler, "CS03JAPX-1" (number-average fiber diameter of 10 μm, number-average fiber length of 3 mm, and number-average aspect ratio of 300) manufactured by Asahi Fiber Glass Co., Ltd., (iv) talc as the plate-like filler, "MS-KY" (volume-average particle diameter of 14.2 μm) manufactured by Nippon Talc Co., Ltd., and (v) a glass bead as the granular filler, "EGB731" (volume-average particle diameter of 18 μm) manufactured by Potters-Balotini Co., Ltd., thereby obtaining a liquid crystal polyester composition in a pellet form.

The above liquid crystal polyester was all supplied to the extruder through its upstream inlet, and the above fibrous filler, plate-like filler and granular filler were all supplied to the extruder through its downstream inlet.

A number-average aspect ratio of the fibrous filler contained in the above pellet was determined by a method comprising steps of (i) heating the pellet at 600° C. for three hours in an electric furnace, thereby obtaining the fibrous filler, (ii) measuring its fiber length with a microscope, and (iii) calculating its number-average aspect ratio.

The pellet was injection-molded by use of an injection molding machine "PS40E5ASE" manufactured by Nissei Plastic Industrial Co., Ltd., at a cylinder temperature of 340° C. and a mold temperature of 130° C., and an injection rate of 30 cm$^3$/s, thereby obtaining a molded article having a size of 64 mm (vertical length)×64 mm (horizontal length)×0.5 mm (thickness), and two circular holes having a diameter of 10 mm, as shown in FIG. 1.

The molded article was cut along its two dashed lines, thereby obtaining a weld line-containing test piece having a size of 30 mm (vertical length)×64 mm (horizontal length)× 0.5 mm (thickness).

The test piece was subjected to a three-point bending test, thereby measuring fracture energy of its weld part, the fracture energy being defined as a value obtained by means of integrating a bending stress loaded until a fracture point by an amount of a bending strain. The larger the fracture energy is, the larger the weld strength is. Results are summarized in Table 1.

screw extruder, "PCM-30HS" manufactured by Ikegai Corp.: (i) above-produced liquid crystal polyester (1); (ii) above-produced liquid crystal polyester (2); (iii) a chopped glass fiber (1) as the fibrous filler, "CS03JAPX-1" (number-average fiber diameter of 10 μm, number-average fiber length of 3 mm, and number-average aspect ratio of 300) manufactured by Asahi Fiber Glass Co., Ltd., or a chopped glass fiber (2) (number-average fiber diameter of 6 μm, number-average fiber length of 3 mm, and number-average aspect ratio of 500) manufactured by Nitto Boseki Co., Ltd.; and (iv) talc as the plate-like filler, "MS-KY" (volume-average particle diameter of 14.2 μm) manufactured by Nippon Talc Co., Ltd., thereby obtaining a liquid crystal polyester composition in a pellet form.

Regarding a method of supplying above components (i) to (iv) to the extruder, 55% by weight of all the above liquid crystal polyester and 15% by weight of all the above chopped glass fiber were supplied to the extruder through its upstream inlet, and the remaining liquid crystal polyester, the remaining chopped glass fiber, and all the above talc were supplied to the extruder through its downstream inlet.

A number-average aspect ratio of the fibrous filler contained in the above pellet was determined by a method comprising steps of (i) heating the pellet at 600° C. for three hours in an electric furnace, thereby obtaining the fibrous filler, (ii) measuring its fiber length with a microscope, and (iii) calculating its number-average aspect ratio.

The pellet was injection-molded by use of an injection molding machine "PS40E5ASE" manufactured by Nissei Plastic Industrial Co., Ltd., at a cylinder temperature of 340° C. and a mold temperature of 130° C., and an injection rate of 30 cm$^3$/s, thereby obtaining a molded article having a size of 64 mm (vertical length)×64 mm (horizontal length)×0.5 mm (thickness), and two circular holes having a diameter of 10 mm, as shown in FIG. 1.

The molded article was cut along its two dashed lines, thereby obtaining a weld line-containing test piece having a size of 30 mm (vertical length)×64 mm (horizontal length)× 0.5 mm (thickness).

The test piece was subjected to a three-point bending test, thereby measuring fracture energy of its weld part, the frac-

TABLE 1

|  | Example |  |  |  |  |  | Comparative Example |  |  |  |  |
|---|---|---|---|---|---|---|---|---|---|---|---|
|  | 1 | 2 | 3 | 4 | 5 | 6 | 1 | 2 | 3 | 4 | 5 |
| Proportion (part by weight) | | | | | | | | | | | |
| Liquid crystal polyester (1) | 55 | 55 | 55 | 55 | 55 | 55 | 55 | 55 | 55 | 55 | 55 |
| Liquid crystal polyester (2) | 45 | 45 | 45 | 45 | 45 | 45 | 45 | 45 | 45 | 45 | 45 |
| Chopped glass fiber | 45 | 51 | 45 | 47 | 42 | 60 | 82 | 27 | 36 | 40 | 42 |
| Talc | 36 | 38 | 38 | 36 | 38 | 40 | — | 55 | 45 | 42 | 47 |
| Glass bead | — | — | 6 | 6 | 9 | — | — | — | — | — | — |
| Weight ratio of chopped glass fiber to talc | 1.25 | 1.35 | 1.20 | 1.32 | 1.10 | 1.50 | ∞ | 0.50 | 0.80 | 0.96 | 0.88 |
| Fracture energy (MPa) | 12.0 | 13.3 | 12.7 | 12.9 | 12.6 | 12.4 | 11.3 | 9.6 | 11.0 | 11.0 | 11.5 |

Examples 7 to 10 and Comparative Examples 6 to 9

There were melt-kneaded below-mentioned components (i) to (iv) at 330° C. with one another in their respective proportions as shown in Table 2, by use of a co-rotating twin ture energy being defined as a value obtained by means of integrating a bending stress loaded until a fracture point by an amount of a bending strain. The larger the fracture energy is, the larger the weld strength is. Results are summarized in Table 2.

TABLE 2

|  | Example | | | | Comparative Example | | | |
| --- | --- | --- | --- | --- | --- | --- | --- | --- |
|  | 7 | 8 | 9 | 10 | 6 | 7 | 8 | 9 |
| Proportion (part by weight) | | | | | | | | |
| Liquid crystal polyester (1) | 55 | 55 | 55 | 55 | 55 | 55 | 55 | 55 |
| Liquid crystal polyester (2) | 45 | 45 | 45 | 45 | 45 | 45 | 45 | 45 |
| Chopped glass fiber (1) | 45 | 51 | 40 | — | 17 | 27 | 36 | 33 |
| Chopped glass fiber (2) | — | — | — | 51 | — | — | — | — |
| Talc | 36 | 38 | 27 | 38 | 50 | 55 | 45 | 33 |
| Weight ratio of chopped glass fiber to talc | 1.25 | 1.35 | 1.50 | 1.35 | 0.33 | 0.50 | 0.80 | 1.00 |
| Polyester composition | | | | | | | | |
| Number-average aspect ratio | 20 | 24 | 20 | 22 | 21 | 21 | 22 | 22 |
| Fracture energy (MPa) | 10.5 | 11.0 | 10.3 | 11.2 | 9.1 | 9.4 | 9.6 | 9.6 |

The invention claimed is:

1. A liquid crystal polyester composition, comprising:
100 parts by weight of a liquid crystal polyester; and
65 to 100 parts by weight of a combination of a fibrous filler with a plate-like filler;
wherein the fibrous filler has a number-average fiber diameter of 5 to 15 µm, and a number-average aspect ratio of 20 to 40, and a content ratio by weight of the fibrous filler to the plate-like filler is more than 1.0 and 1.6 or less.

2. The liquid crystal polyester composition according to claim 1, wherein the liquid crystal polyester contains a repeating unit represented by following formula (1), a repeating unit represented by following formula (2) and a repeating unit represented by following formula (3):

$$-O-Ar^1-CO-, \quad (1)$$

$$-CO-Ar^2-CO-, \quad (2)$$

$$-X-Ar^3-Y-, \quad (3)$$

$$-Ar^4-Z-Ar^5- \quad (4)$$

wherein $Ar^1$ represents a phenylene group, a naphthylene group or a biphenylylene group; $Ar^2$ and $Ar^3$ represent independently of each other a phenylene group, a naphthylene group, a biphenylylene group or a group represented by above formula (4); X and Y represent independently of each other an oxygen atom or an imino group (—NH—); $Ar^4$ and $Ar^5$ represent independently of each other a phenylene group or a naphthylene group; Z represents an oxygen atom, a sulfur atom, a carbonyl group, a sulfonyl group or an alkylidene group; and one or more hydrogen atoms contained in the group represented by $Ar^1$, $Ar^2$ or $Ar^3$ may be substituted independently of one another with a halogen atom, an alkyl group or an aryl group.

3. The liquid crystal polyester composition according to claim 2, wherein $Ar^1$ is a p-phenylene group or a 2,6-naphthylene group; $Ar^2$ is a p-phenylene group, a m-phenylene group or a 2,6-naphthylene group; $Ar^3$ is a p-phenylene group or a 4,4'-biphenylylene group, and both X and Y are an oxygen atom.

4. The liquid crystal polyester composition according to claim 2, wherein the liquid crystal polyester contains the repeating unit represented by formula (1) in an amount of 30 to 80% by mol, the repeating unit represented by formula (2) in an amount of 10 to 35% by mol, and the repeating unit represented by formula (3) in an amount of 10 to 35% by mol, provided that the total of the repeating units represented by respective formulas (1), (2) and (3) contained in the liquid crystal polyester is 100% by mol.

5. The liquid crystal polyester composition according to claim 1, wherein the fibrous filler is one or a combination of two or more selected from the group consisting of a glass fiber, a potassium titanate whisker, a wollastonite whisker and an aluminum borate whisker.

6. The liquid crystal polyester composition according to claim 1, wherein the plate-like filler is talc and/or mica.

7. The liquid crystal polyester composition according to claim 1, wherein the plate-like filler has a volume-average particle diameter of 10 to 30 µm.

8. The liquid crystal polyester composition according to claim 1, wherein the liquid crystal polyester composition further comprises 5 to 10 parts by weight of a granular filler, per 100 parts by weight of the liquid crystal polyester.

9. The liquid crystal polyester composition according to claim 8, wherein the granular filler is a glass bead.

10. The liquid crystal polyester composition according to claim 8, wherein the granular filler has a volume-average particle diameter of 5 to 50 µm.

11. A process for producing a liquid crystal polyester composition, comprising a step of melt-kneading (i) 100 parts by weight of a liquid crystal polyester, and (ii) 65 to 100 parts by weight of a combination of a fibrous filler with a plate-like filler, the fibrous filler having a number-average fiber diameter of 5 to 15 µm, and a number-average aspect ratio of 100 or more, thereby producing a liquid crystal polyester composition comprising:
100 parts by weight of the liquid crystal polyester; and
65 to 100 parts by weight of the combination of the fibrous filler with the plate-like filler;
wherein the fibrous filler has a number-average fiber diameter of 5 to 15 µm, and a number-average aspect ratio of 20 to 40, and a content ratio by weight of the fibrous filler to the plate-like filler in the liquid crystal polyester composition is more than 1.0 and 1.6 or less.

12. The process according to claim 11, wherein the liquid crystal polyester contains a repeating unit represented by following formula (1), a repeating unit represented by following formula (2) and a repeating unit represented by following formula (3):

$$-O-Ar^1-CO-, \quad (1)$$

$$-CO-Ar^2-CO-, \quad (2)$$

$$-X-Ar^3-Y-, \quad (3)$$

$$-Ar^4-Z-Ar^5- \quad (4)$$

wherein $Ar^1$ represents a phenylene group, a naphthylene group or a biphenylylene group; $Ar^2$ and $Ar^3$ represent independently of each other a phenylene group, a naphthylene group, a biphenylylene group or a group represented by above formula (4); X and Y represent independently of each other an oxygen atom or an imino group (—NH—); $Ar^4$ and $Ar^5$ represent independently of each other a phenylene group or a naphthylene group; Z represents an oxygen atom, a sulfur atom, a carbonyl group, a sulfonyl group or an alkylidene group; and one or more hydrogen atoms contained in the group represented by $Ar^1$, $Ar^2$ or $Ar^3$ may be substituted independently of one another with a halogen atom, an alkyl group or an aryl group.

13. The process according to claim 12, wherein $Ar^1$ is a p-phenylene group or a 2,6-naphthylene group; $Ar^2$ is a p-phenylene group, a m-phenylene group or a 2,6-naphthylene group; $Ar^3$ is a p-phenylene group or a 4,4'-biphenylylene group, and both X and Y are an oxygen atom.

14. The process according to claim 12, wherein the liquid crystal polyester contains the repeating unit represented by formula (1) in an amount of 30 to 80% by mol, the repeating unit represented by formula (2) in an amount of 10 to 35% by mol, and the repeating unit represented by formula (3) in an amount of 10 to 35% by mol, provided that the total of the repeating units represented by respective formulas (1), (2) and (3) contained in the liquid crystal polyester is 100% by mol.

15. The process according to claim 11, wherein the fibrous filler is one or a combination of two or more selected from the group consisting of a glass fiber, a potassium titanate whisker, a wollastonite whisker and an aluminum borate whisker.

16. The process according to claim 11, wherein the plate-like filler is talc and/or mica.

17. The process according to claim 11, wherein the plate-like filler has a volume-average particle diameter of 10 to 30 µm.

18. The process according to claim 11, wherein the liquid crystal polyester composition further comprises 5 to 10 parts by weight of a granular filler, per 100 parts by weight of the liquid crystal polyester.

19. The process according to claim 18, wherein the granular filler is a glass bead.

20. The process according to claim 18, wherein the granular filler has a volume-average particle diameter of 5 to 50 µm.

21. A process for producing a molded article, comprising a step of injection-molding the liquid crystal polyester composition of claim 1.

22. The process according to claim 21, wherein the molded article is a connector.

23. A process for producing a molded article, comprising a step of injection-molding the liquid crystal polyester composition produced by the process of claim 11.

* * * * *